United States Patent
Machi et al.

(10) Patent No.: US 12,437,901 B2
(45) Date of Patent: Oct. 7, 2025

(54) HIGH-TEMPERATURE SUPERCONDUCTING COATED CONDUCTOR AND METHOD FOR MANUFACTURING SAME

(71) Applicant: National Institute of Advanced Industrial Science and Technology, Tokyo (JP)

(72) Inventors: Takato Machi, Ibaraki (JP); Teruo Izumi, Ibaraki (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 258 days.

(21) Appl. No.: 18/273,614

(22) PCT Filed: Jan. 17, 2022

(86) PCT No.: PCT/JP2022/001333
§ 371 (c)(1),
(2) Date: Jul. 21, 2023

(87) PCT Pub. No.: WO2022/158413
PCT Pub. Date: Jul. 28, 2022

(65) Prior Publication Data
US 2024/0079162 A1    Mar. 7, 2024

(30) Foreign Application Priority Data
Jan. 25, 2021 (JP) .................. 2021-009425

(51) Int. Cl.
*H01B 12/00* (2006.01)
*H01B 12/06* (2006.01)
*H01B 13/00* (2006.01)

(52) U.S. Cl.
CPC .......... *H01B 12/06* (2013.01); *H01B 13/003* (2013.01)

(58) Field of Classification Search
CPC .......................... H01B 12/06; H01B 13/003
See application file for complete search history.

(56) References Cited

U.S. PATENT DOCUMENTS

| | | | |
|---|---|---|---|
| 2012/0035055 A1* | 2/2012 | Iwakuma | H10N 60/0828 505/211 |
| 2014/0148343 A1* | 5/2014 | Tobita | H10N 60/857 174/125.1 |
| 2015/0318083 A1* | 11/2015 | Takemoto | H01B 12/06 505/211 |

OTHER PUBLICATIONS

Machi etal. Trend in Scribing Technologies for RE-based High-Tc Superconducting Coated Conductors, Teion Kogaku vol. 50 No. 10 (2015).

(Continued)

*Primary Examiner* — Pete T Lee
(74) *Attorney, Agent, or Firm* — Shih IP Law Group, PLLC

(57) ABSTRACT

A purpose of the present invention is to provide a coated conductor having a high critical current and low AC loss. The high-temperature superconducting coated conductor that achieves this purpose has an elongated first metal substrate, and multiple filaments arranged on the first metal substrate so as to extend in a longitudinal direction of the first metal substrate. The multiple filaments are arranged approximately in parallel with gaps therebetween, and each filament includes, in order from the first metal substrate side, a first superconducting layer containing a rare earth element, first stabilizing layers, second stabilizing layers, and a second superconducting layer containing a rare earth element.

12 Claims, 7 Drawing Sheets

(56) References Cited

OTHER PUBLICATIONS

Takanobu Kiss, et al, "Current-Voltage Characteristics in Face-to-Face Double Stacked (FFDS) 1-mm-Wide REBCO Coated Conductor Tapes", the 96th Annual Spring 2018, Cryogenics and Superconductivity Society of Japan, May 2018.

Yudai Onitsuka, et al, "Improvement of Robustness of Current Transport Properties in REBCO Coated Conductor by Face-to-Face Double Stack Structure", the 98th Annual Spring 2019, Cryogenics and Superconductivity Society of Japan, May 2019.

\* cited by examiner

HIGH-TEMPERATURE SUPERCONDUCTING COATED CONDUCTOR AND METHOD FOR MANUFACTURING SAME

TECHNICAL FIELD

The present invention relates to a high-temperature superconducting coated conductor and a manufacturing method for the same.

BACKGROUND ART

High temperature superconductors, the critical temperature of which exceeds the liquid nitrogen temperature, are expected to be applied to superconducting magnets, superconducting cables, power apparatuses and devices and the like, and many research results have been reported.

To apply a high temperature superconductor to the above-mentioned fields, it needs to be provided in the form of a long conductor. In particular, generally, in the case where a compound containing rare earth as the high temperature superconducting materials is used, it is provided in the form of a tape shape conductor, so called a coated conductor in which high temperature superconducting materials is deposited on a metal substrate composed of a metal tape.

Normally, with high-temperature superconducting coated conductors, AC loss occurs. The types of AC loss include hysteresis loss and coupling loss, and the above-described coated conductor entails significant hysteresis loss. In particular, the greater the width of the coated conductor, the more significant the influence of the hysteresis loss. In view of this, a method of reducing the AC loss by dividing the superconducting layer in the coated conductor into a multi-filamentary structure in the width direction has been proposed (e.g., NPL 1). With this method, the above-mentioned AC loss is reduced while the amount of the superconducting current flowing through each superconducting layer (hereinafter referred to also as "filament coated conductor") is small. In addition, the desired amount of superconducting current can be obtained by increasing the number of filament coated conductors.

Note that when the width of each filament is reduced, it is more affected by defects in the high-temperature superconducting layer. More specifically, if there is a defect in the filament, the superconducting current is blocked by the defect, and the superconducting current does not flow therethrough. When some filament does not function, the critical current is reduced.

In view of this, it is conceivable to reduce the defects in the high-temperature superconducting layer. Because the high-temperature superconducting layer is produced through a thin film formation process, it is very difficult to completely eliminate the defects (portions that reduce the critical current) in the high-temperature superconducting layer with current technology.

On the other hand, a technique of reducing the influence of the defects in the high-temperature superconducting layer by stacking two high-temperature superconducting coated conductors has been proposed (see NPL 2 and NPL 3). With this technique, even when there is a defect in one high-temperature superconducting coated conductor, the superconducting current can flow through the other high-temperature superconducting coated conductor, and thus the reduction of the critical current is suppressed.

CITATION LIST

Non-Patent Literature

NPL 1
Takato MACHI, et al, "Trend in Scribing Technologies for RE-based High-Tc Superconducting Coated Conductors", TEION KOUGAKU, 2015, Vol 50, No. 10

NPL 2
Takanobu KISS, et al, "Current-Voltage Characteristics in Face-to-Face Double Stacked (FFDS) 1-mm-Wide REBCO Coated Conductor Tapes", the 96th Annual Spring 2018, Cryogenics and Superconductivity Society of Japan, May, 2018

NPL 3
Yudai ONITSUKA, et al, "Improvement of Robustness of Current Transport Properties in REBCO Coated Conductor by Face-to-Face Double Stack Structure", the 98th Annual Spring 2019, Cryogenics and Superconductivity Society of Japan, May, 2019

SUMMARY OF INVENTION

Technical Problem

Since the hysteresis loss, which is a main factor of AC loss, increases in proportion to the width of the coated conductor as described above, it is effective for reducing the hysteresis loss to divide the high-temperature superconducting coated conductor in the width direction. Further, it is useful for suppressing the critical current reduction to bond two coated conductors together. In view of this, it is conceivable to combine these techniques. However, since the filament after the high-temperature superconducting coated conductor is divided in the width direction is very narrow, it is difficult to stack two filaments to each other without error. In addition, even when they are successfully stacked to each other, filaments adjacent to each other are easily make contact with each other, and consequently the effect of reducing the coupling loss, which is a second factor of the AC loss, cannot be sufficiently obtained. That is, with known techniques, a coated conductor that achieves small AC loss and a sufficiently high critical current cannot be achieved.

In view of this, an object of the present invention is to provide a high-temperature superconducting coated conductor that achieves small AC loss and a sufficiently high critical current, and a manufacturing method for the same.

Solution to Problem

Specifically, the present invention provides the following high-temperature superconducting coated conductor. A high-temperature superconducting coated conductor: a first metal substrate with a long shape; and multiple filaments disposed on the first metal substrate and extended along a longitudinal direction of the first metal substrate, wherein a gap is provided between each of the multiple filaments, and each of the multiple filaments includes a first superconducting layer containing a rare-earth element, a first stabilization layers, a second stabilization layers, a second superconducting layer containing a rare-earth element, and a second metal substrate in this order from the first metal substrate side.

The present invention also provides the following manufacturing method for the high-temperature superconducting coated conductor. A manufacturing method for a high-temperature superconducting coated conductor, the method comprising: preparing a first coated conductor with a long shape and a second coated conductor with a long shape, the first coated conductor including a first metal substrate, a first superconducting layer deposited on the first metal substrate and containing a rare-earth element, and a first stabilization layers deposited on the first superconducting layer, the second coated conductor including a second metal substrate, a second superconducting layer deposited on the second metal substrate and containing a rare-earth element, and a second stabilization layers deposited on the second superconducting layer; connecting the first coated conductor and the second coated conductor such that the first stabilization layers and the second stabilization layers face each other; and forming a groove dividing the second coated conductor, the first stabilization layers, and the first superconducting layer along a longitudinal direction of the first coated conductor and the second coated conductor.

Advantageous Effects of Invention

The high-temperature superconducting coated conductor of the present invention achieves small AC loss and a sufficiently high critical current. In addition, according to the manufacturing method for the high-temperature superconducting coated conductor of the present invention, a high-temperature superconducting coated conductor can be produced by a simple method without complicated processes.

DESCRIPTION OF EMBODIMENTS

The numerical ranges with the word "to" in this specification mean the numerical range including the numerical values before and after "to".

The configuration and physical property of the high-temperature superconducting coated conductor of the present invention are described below. Thereafter, the manufacturing method for the high-temperature superconducting coated conductor will be described.

1. High-Temperature Superconducting Coated Conductor

Figure 1A:
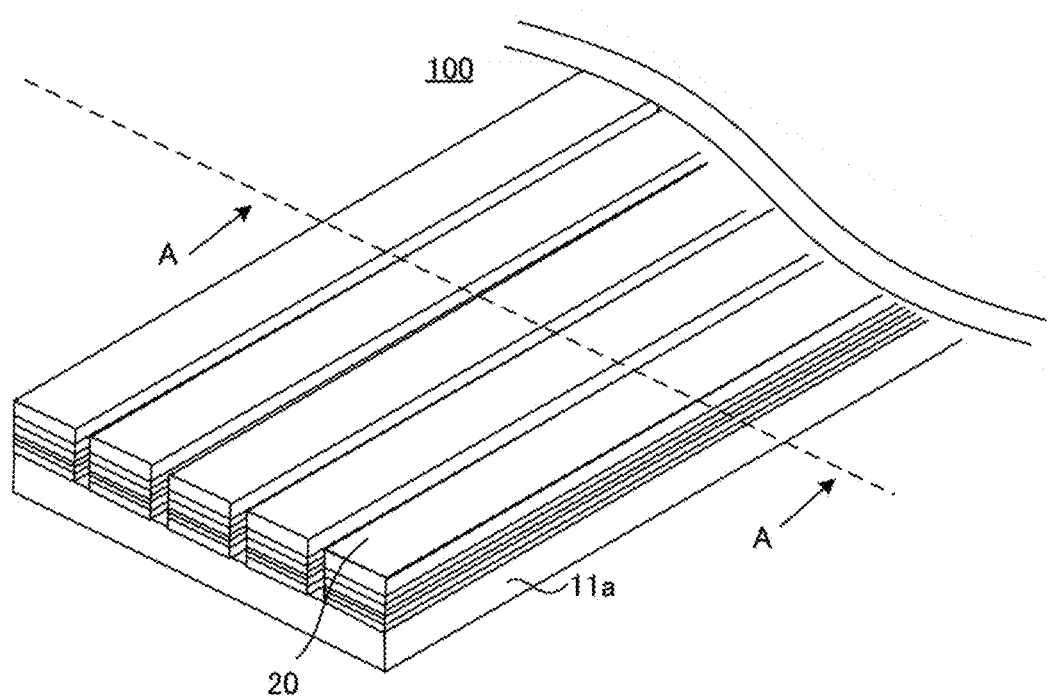
FIG. 1A is a perspective view of a high-temperature superconducting coated conductor according to an embodiment of the present invention.
Figure 1B:
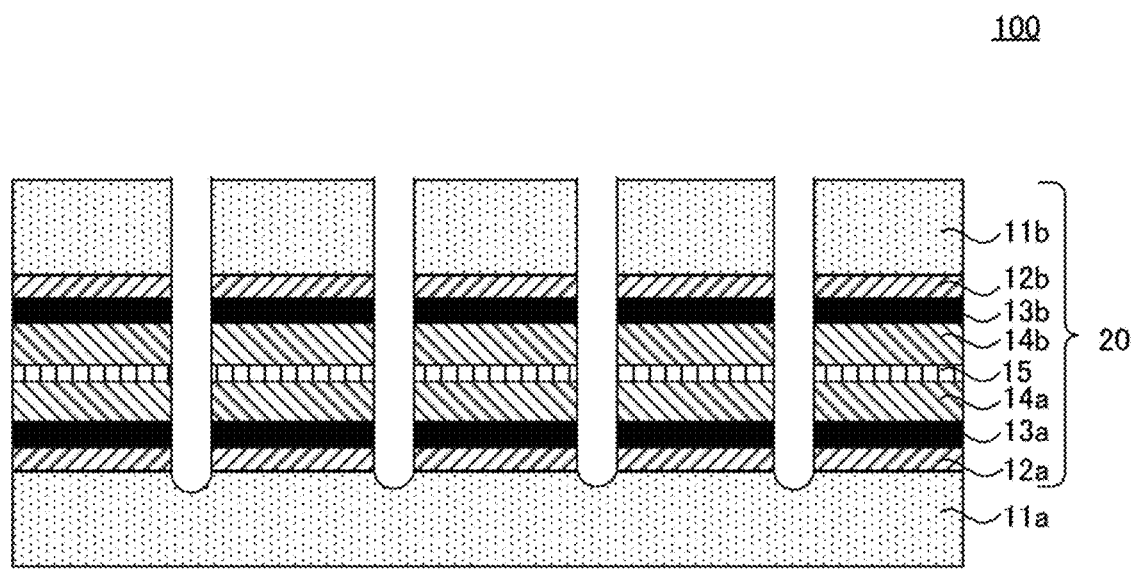
FIG. 1B is a cross-sectional view taken along line A-A in FIG. 1A.

FIGS. 1A and 1B are schematic views illustrating the high-temperature superconducting coated conductor according to an embodiment of the present invention. Note that the high-temperature superconducting coated conductor of the present invention is not limited to the embodiment. FIG. 1A is a schematic perspective view illustrating high-temperature superconducting coated conductor 100, and FIG. 1B is a cross-sectional view of the high-temperature superconducting coated conductor 100 taken along line A-A in FIG. 1A. As illustrated in FIG. 1A, high-temperature superconducting coated conductor 100 of the present embodiment includes multiple filaments 20 disposed with a gap therebetween on long first metal substrate 11a. Filaments 20 are extended in the longitudinal direction of first metal substrate 11a and disposed at an interval such that filaments 20 adjacent to each other are parallel to and completely separated from each other. Note that in this specification, the state where filaments 20 adjacent to each other are completely separated means that the side walls of filaments 20 adjacent to each other are not in contact and are not electrically coupled with each other.

In addition, as illustrated in FIG. 1B, each filament 20 has a structure in which first buffer layers 12a, first superconducting layer 13a, first stabilization layers 14a, connection layer 15, second stabilization layers 14b, second superconducting layer 13b, second buffer layers 12b, and second metal substrate 11b are stacked. Note that first buffer layers 12a, second buffer layers 12b, and connection layer 15 need not necessarily be disposed.

Since the multiple filaments 20 are disposed with a gap therebetween in high-temperature superconducting coated conductor 100 of the present embodiment, they are less likely to be electrically coupled, resulting in low coupling loss. In addition, since each filament 20 includes first superconducting layer 13a and second superconducting layer 13b (hereinafter referred to also collectively as "superconducting layer 13"), it is less affected by defects in superconducting layer 13, and the critical current is less reduced.

Figure 2A:
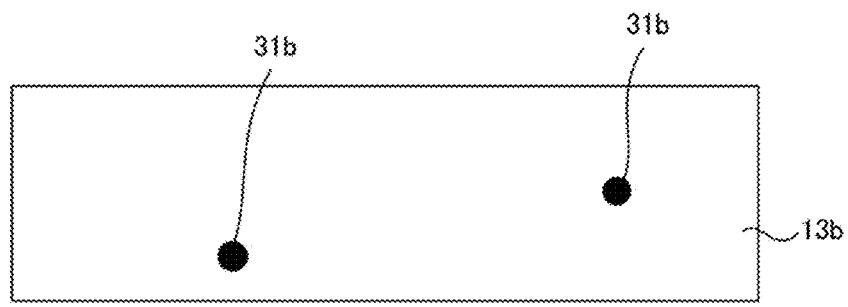
FIGS. 2A to 2C are schematic views illustrating a first superconducting layer, a second superconducting layer, and a defect.
Figure 2A:
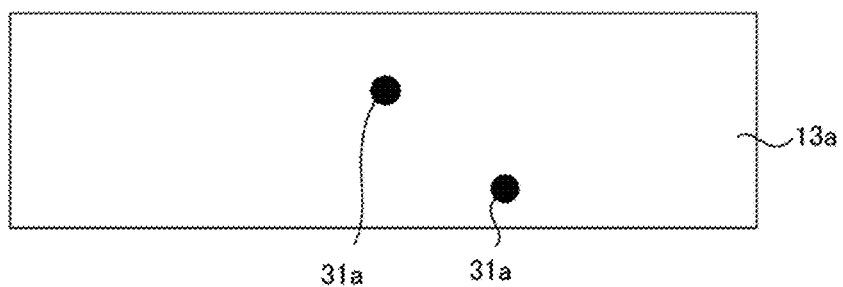
Figure 2B:
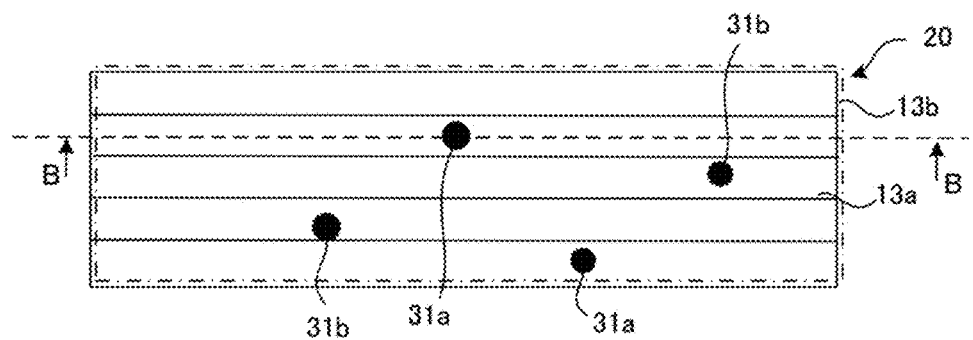
Figure 2C:
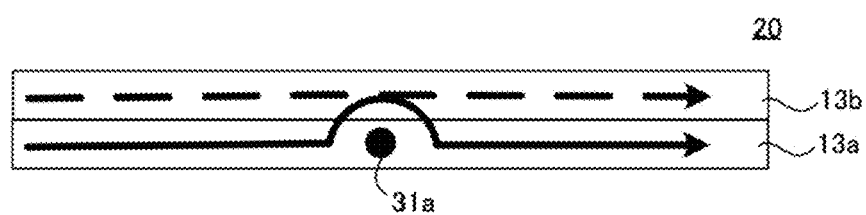

The reason for this is described below with reference to the schematic views of FIGS. 2A to 2C. FIG. 2A is a schematic view illustrating planar shapes of first superconducting layer 13a and second superconducting layer 13b, and FIG. 2B is a schematic view illustrating planar shapes of first superconducting layer 13a and second superconducting layer 13b in a stacked state. In addition, FIG. 2C is a cross-sectional view taken along line B-B of FIG. 2B. Note that FIG. 2C illustrates first superconducting layer 13a and second superconducting layer 13b in a directly stacked state for convenience of the illustration, but in practice, first stabilization layers 14a, connection layer 15, second stabilization layers 14b and the like are disposed therebetween.

In general, the density of defects 31a and 31b contained in each superconducting layer 13 are relatively small. For example, it is approximately 10 to 50 in the case of a coated conductor with a length of 1 m and a width of 10 mm. Therefore, as illustrated in FIG. 2A, when first superconducting layer 13a containing defect 31a and second superconducting layer 13b containing defect 31b are stacked, the probability of overlap of defect 31a in first superconducting layer 13a and defect 31b in second superconducting layer 13b is very low (see FIGS. 2B and 2C). Therefore, in the case where first superconducting layer 13a and second superconducting layer 13b are divided in the width direction as filament 20, even when a part of the superconducting current flowing through first superconducting layer 13a (the flow indicated with the solid line in FIG. 2C) is blocked by defect 31a, the superconducting current flowing through second superconducting layer 13b (the flow indicated with the broken line in FIG. 2C) is not affected by defect 31a. Further, in high-temperature superconducting coated conductor 100 with the configuration of the present embodiment, a bypass of the superconducting current from first superconducting layer 13a toward second superconducting layer 13b is formed near defect 31a. That is, the superconducting current in the first superconducting layer 13a flows without being blocked by defect 31a. Accordingly, the amount of the superconducting current flowing through each filament 20 is less reduced, and the critical current of high-temperature superconducting coated conductor 100 is less reduced. Note that the superconducting current bypassing defect 31a returns to first superconducting layer 13a side in FIG. 2C, but the superconducting current may continue to flow in second superconducting layer 13b. Each configuration is described below.

First Metal Substrate

The shape of first metal substrate 11a is not limited as long as it is a long substrate and the multiple filaments 20 described later can be supported on one substrate. Note that preferably, first metal substrate 11a is provided with all of low magnetism, high heat resistance, and high strength. When first metal substrate 11a has all such properties, high-temperature superconducting coated conductor 100 can be more easily applied to various uses. First metal substrate 11a may be composed of a single layer or multiple layers.

In addition, examples of the material of first metal substrate 11a include nickel (Ni), nickel alloys, tungsten alloys, stainless steel, silver (Ag), and copper (Cu). More specifically, Ni—Cr-based alloys such as Ni—Cr—Fe—Mo-based HASTELLOY (registered trademark) B, C and X; W—Mo-based alloys; Fe—Cr-based alloys such as austenitic stainless steel; non-magnetic Fe—Ni-based alloys; and the like are included. Preferably, the Vickers hardness (Hv) of first metal substrate 11a is 150 or greater in view of the strength. In addition, preferably, the thickness of first metal substrate 11a is 100 μm or smaller.

Here, first metal substrate 11a may have a plate shape, but grooves and corresponding recesses for dividing filament 20 may be provided as illustrated in FIG. 1B. Note that since the handleability and/or the strength of high-temperature superconducting coated conductor 100 may possibly be reduced if the depth of the recess is excessive, and therefore the depth is set to an appropriate value.

Filament

In each filament 20 of the present embodiment, first buffer layers 12a, first superconducting layer 13a, first stabilization layers 14a, connection layer 15, second stabilization layers 14b, second superconducting layer 13b, and second metal substrate 11b are disposed in this order from the above-described first metal substrate 11a side.

First buffer layers 12a and second buffer layers 12b (hereinafter referred to also collectively as "buffer layers 12") are layers for facilitating formation of first superconducting layer 13a and/or second superconducting layer 13b on first metal substrate 11a and/or second metal substrate 11b, and first buffer layers 12a and second buffer layers 12b may be the same layers or different layers.

Essentially, buffer layers 12 must have biaxial orientation, and may be composed of multi-layers. Preferably, in the case where buffer layers 12 are composed of multi-layers, a diffusion prevention layer for suppressing the diffusion of the element to superconducting layer 13 side from first metal substrate 11a and/or second metal substrate 11b, the alignment layers deposited for providing biaxial orientation to buffer layers 12 and the like are stacked.

For example, buffer layers 12 composed of multi-layers may be a multilayer structure in which an $Al_2O_3$ layer or a $Gd_2ZrO_7$ layer (first layer), a $Y_2O_3$ layer (second layer), a MgO layer (third layer), a $LaMnO_3$ layer (fourth layer), and a $CeO_2$ layer (fifth layer) are deposited in this order, or the like. Note that buffer layers 12 is not limited to this configuration, and may have various configurations such as a configuration with no $CeO_2$ layer (fifth layer) and a configuration in which $Al_2O_3/Y_2O_3$ serves as a first layer and a second layer, for example. In addition, the thickness of each layer may be selected as necessary. In addition, the thickness of each layer may be uniform in the entirety of the longitudinal direction of filament 20, or may be partially varied in some regions. In the buffer layers 12, the first layer is deposited on the above-mentioned first metal substrate 11a. Preferably, the total thickness of the above-mentioned buffer layers 12 is normally smaller than 1.0 μm.

On the other hand, superconducting layer 13 (first superconducting layer 13a and second superconducting layer 13b) is not limited as long as it is a layer containing superconductor with rare-earth elements. Examples of superconducting layer 13 include layers containing $REBa_2Cu_3O_x$ compounds (RE represents at least one element selected from the group consisting of Gd, Eu, Y, Sm, Nd, Dy, Er, Yb, Ho, La, Tb, Tm, and Lu, and x represents 6.2 to 7.0) as a superconductor. Preferably, RE is Y, Gd, or Eu or a combination of Y and Gd, more preferably Y, or a combination of Y and Gd while RE may be any of the above-mentioned elements. In addition, preferably, the amount of $REBa_2Cu_3O_x$ compound in superconducting layer 13 is 70 volume percent or greater, more preferably 80 to 100 volume percent. First superconducting layer 13a and second superconducting layer 13b may be the same layers or different layers.

In addition, preferably, the thickness of superconducting layer 13 is 0.5 μm to 5.0 μm, more preferably 1.0 μm to 2.0 μm. With the thickness of superconducting layer 13 within this range, high-temperature superconducting coated conductor 100 can be easily applied to various uses.

First stabilization layers 14a and second stabilization layers 14b (hereinafter referred to also collectively as "stabilization layers 14") are layers for suppressing the alteration of superconducting layer 13 and the like, and are layers containing silver that less reacts with the superconductor in superconducting layer 13. In addition to a layer composed of silver, stabilization layers 14 may include a layer containing copper, gold, platinum, their alloys, or the like. First stabilization layers 14a and second stabilization layers 14b may be the same layers or different layers. In addition, preferably, the thickness of stabilization layers 14 is several micrometers or greater.

Second metal substrate 11b may be the same substrate as the above-described first metal substrate 11a except that it is divided into multiple filaments in accordance with the shape of filament 20. First metal substrate 11a and second metal substrate 11b may contain the same material, or different materials. The thicknesses of first metal substrate 11a and second metal substrate 11b may be the same or different.

Preferably, connection layer 15 is a layer formed with materials with electric conductivity such as solder and alloy paste. Preferably, the resistance of connection layer 15 is normally 100 mΩ or smaller, more preferably 50 mΩ or smaller. In the case where the resistance of connection layer 15 is 100 mΩ or smaller, a bypass is easily formed on the other superconducting layer 13 side even when one superconducting layer 13 has a defect as described above, and the critical current of the high-temperature superconducting coated conductor tends to be increased.

Preferably, the thickness of connection layer 15 is 2 μm to 20 μm. When the thickness of connection layer 15 is within this range, the above-mentioned bypass is easily formed. On the other hand, first stabilization layers 14a and second stabilization layers 14b may be connected to each other through diffusion connection utilizing the diffusion of the silver (or copper) in stabilization layers 14 without using the above-mentioned connection layer 15.

Here, preferably, the line width of each filament 20 is normally 100 μm to 1.5 mm while it is selected as necessary in accordance with the use of the high-temperature superconducting coated conductor and the like. When the line width of each filament 20 is within the above-mentioned range, AC loss is easily reduced. Note that the line width in one filament 20 may be constant or may be varied continuously or intermittently while the line width is normally constant. In addition, the line widths of the plurality of filaments 20 may be the same or different, while the line widths are normally the same. Note that in this specification, the line width of each filament 20 is the line width of the top surface of each filament 20 in planar view of high-temperature superconducting coated conductor 100.

In addition, preferably, the summed area of the top surface of the filament is normally 80% or greater of the summed area of the region where filament 20 is formed and the region where gap (groove) is formed in planar view of high-temperature superconducting coated conductor 100, while it is selected as necessary in accordance with the use of the high-temperature superconducting coated conductor. When the summed area of the top surface of the filament is 80% or greater of the summed area of the region where filament 20 is formed and the region where the gap (groove) is formed, the groove width is sufficiently small, and sufficient superconducting current is easily obtained.

Here, preferably, the top surface of each filament 20 is normally a planar shape, while it may be other shapes than a planar shape in accordance with the use of high-temperature superconducting coated conductor 100. On the other hand, preferably, the shape of the side wall of each filament 20 is a shape with no projections or protrusions that make contact with the side wall of the adjacent filament 20, more preferably a planar shape, while it depends on the formation method of the groove.

Further, the shape of each filament 20 in the cross section perpendicular to the longitudinal direction is not limited, and may be a square shape, a rectangular shape, a trapezoidal shape or the like.

In addition, preferably, the distance between filaments 20 adjacent to each other, i.e., the width of the groove located between filaments 20 adjacent to each other is 1 μm to 150 μm, more preferably 5 μm to 100 μm. When the width of the groove is 1 μm or greater, the side walls of filaments 20 adjacent to each other are less electrically coupled, and thus the AC loss of high-temperature superconducting coated conductor can be suppressed. On the other hand, when the groove width is greater than 150 μm, the number of filaments 20 that can be disposed in one high-temperature superconducting coated conductor 100 is reduced and the amount of the superconducting current flowing through high-temperature superconducting coated conductor 100 is reduced. Note that in this specification, the width of the groove is the end-to-end distance of the top surfaces of filaments 20 facing each other with the groove therebetween in planar view of high-temperature superconducting coated conductor 100.

The width of the groove may be constant or varied in each groove, while normally it is constant. Further, in the case where high-temperature superconducting coated conductor 100 includes a plurality of grooves, the widths of the plurality of grooves may be the same or different, while normally it is constant.

In addition, preferably, the number of filaments 20 provided in coated conductor 100 is normally 3 to 50, while it is selected as necessary in accordance with the width of coated conductor 100 and the width of filament 20. When coated conductor 100 is provided with such a number of filaments 20, a sufficient superconducting current is easily obtained.

Other Configurations high-temperature superconducting coated conductor 100 may include configurations other than the above-mentioned first metal substrate 11a and filament 20 in so far as they do not impair the objects and effects of the present invention. For example, a layer containing the same material as that of first stabilization layers 14a and/or second stabilization layers 14b, a layer containing the same material as that of connection layer 15, and the like may be further provided on bottom surface side of first metal substrate 11a (the side opposite to filament 20), and/or the top surface side of second metal substrate (the side opposite to second buffer layers 12b).

Further, an insulator (not illustrated) may be disposed between filaments 20 adjacent to each other. When an insulator is disposed, filaments 20 adjacent to each other further less make contact with each other, and AC loss are further reduced.

The type of the insulator may be, but not limited to, resins such as polyimide, polyamide imide, phenol-based resin, polyester-based resin, and polyurethane-based resin, inorganic materials, and the like, for example. Among them, resins are preferable in terms of the ease of placement between filaments 20 adjacent to each other, while polyimide is preferable in terms of the heat resisting property and the like.

The coated conductor of the present invention 100 is applicable to, but not limited to, a superconducting magnet (such as an MRI, a gantry magnet, an accelerator magnet), a superconducting cable, a superconducting rotating machine (such as a motor and a generator), a power apparatus, various devices, and the like.

2. Manufacturing Method for High-Temperature Superconducting Coated Conductor

An embodiment of a manufacturing method for the above-described high-temperature superconducting coated conductor is described below. Note that the manufacturing method for the high-temperature superconducting coated conductor is not limited to the following method.

Figure 3A:
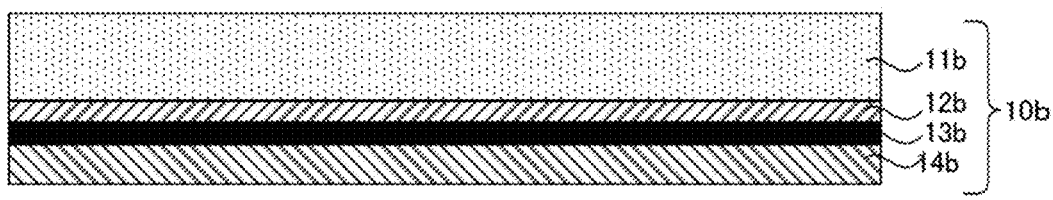
FIGS. 3A to 3C are diagrams illustrating steps of a manufacturing method for the high-temperature superconducting coated conductor of the present invention.
Figure 3A:
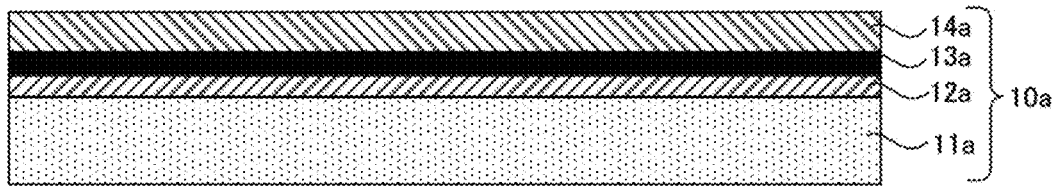
Figure 3B:
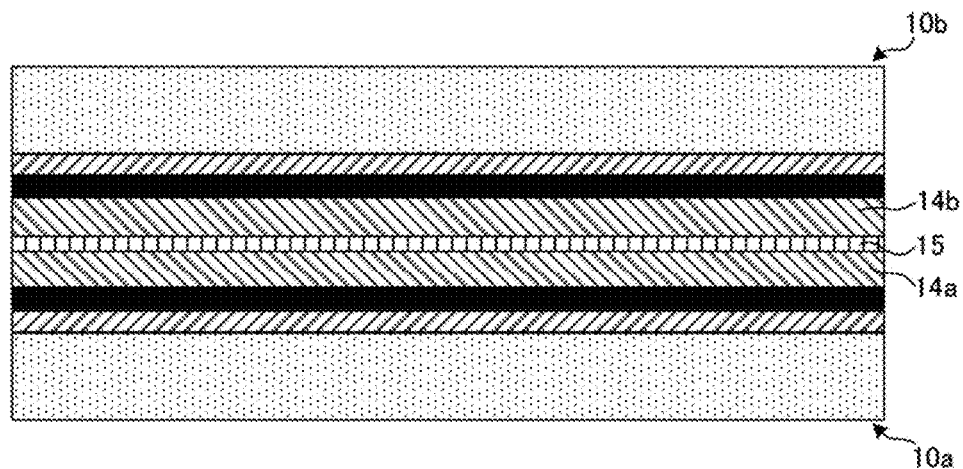
Figure 3C:
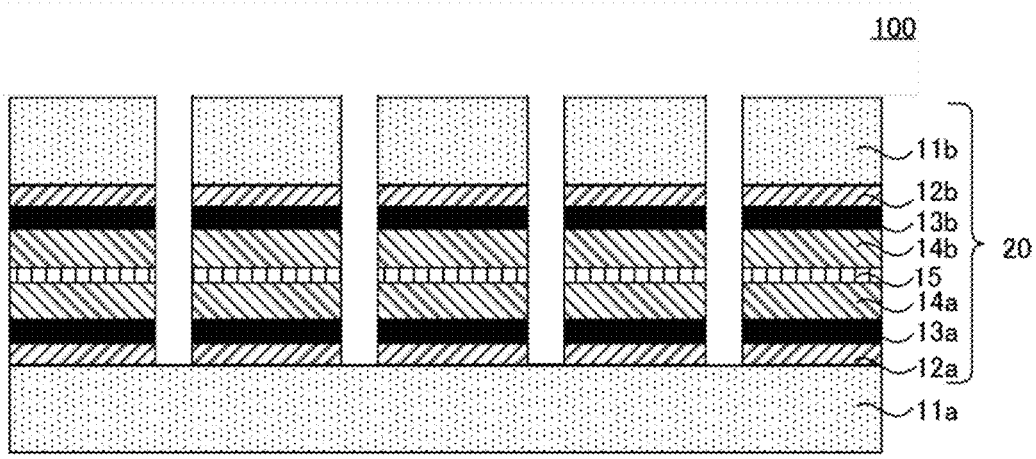

Steps of the manufacturing method for the high-temperature superconducting coated conductor of the present embodiment are illustrated in FIGS. 3A to 3C. In the manufacturing method for the high-temperature superconducting coated conductor of the present embodiment, long first coated conductor 10a including first metal substrate 11a, first buffer layers 12a, first superconducting layer 13a, and first stabilization layers 14a, and a long second coated conductor including second metal substrate 11b, second buffer layers 12b, second superconducting layer 13b, and second stabilization layers 14b are prepared (coated conductor preparation step, FIG. 3A). Then, they are deposited such that first stabilization layers 14a of first coated conductor 10a and second stabilization layers 14b of second coated conductor 10b face each other, and connected to each other with connection layer 15 (connection step, FIG. 3B). Thereafter, a groove that divides at least second coated conductor 10b, first stabilization layers 14a, and first superconducting layer 13a is formed along the longitudinal direction of first coated conductor 10a and second coated conductor 10b (groove formation step, FIG. 3C).

As described above, dividing a superconducting layer of one high-temperature superconducting coated conductor into multiple filaments, and bonding two high-temperature superconducting coated conductors together have been considered in the related art. It is conceivable to combine them; however, the filament is very narrow after the superconducting layer is divided in the width direction, and as such bonding the filaments together has not been realistic.

In view of this, in the manufacturing method of the present embodiment, coated conductors with a relatively large width (first coated conductor 10a and second coated conductor 10b) are bonded to each other in the connection step, and thereafter a groove is formed from one coated conductor (in the present embodiment second coated conductor 10b) side in the groove formation step so as to produce multiple filaments 20. Therefore, it is not necessary to bond narrow filaments to each other, and filaments 20 adjacent to each other can be reliably separated. In addition, according to this method, the distance between filaments 20 adjacent to each other can be reduced, and thus the amount of the superconducting current flowing through high-temperature superconducting coated conductor 100 can be maintained.

Each step of the manufacturing method for the high-temperature superconducting coated conductor of the present embodiment is elaborated below.

Coated Conductor Pre-Preparation Step

In the coated conductor preparation step, long first coated conductor 10a including first metal substrate 11a, first buffer layers 12b, first superconducting layer 13a, and first stabilization layers 14a, and the long second coated conductor including second metal substrate 11b, second buffer layers 12b, second superconducting layer 13b, and second stabilization layers 14b are prepared.

First metal substrate 11a, first buffer layers 12a, first superconducting layer 13a and first stabilization layers 14a making up first coated conductor 10a are the same as respective configurations of the high-temperature superconducting coated conductor described above. First coated conductor 10a can be formed through a common procedure. Note that a commercially available product may be prepared as the first coated conductor.

Likewise, second metal substrate 11b, second buffer layers 12b, second superconducting layer 13b and second stabilization layers 14b making up second coated conductor 10b are the same as respective configurations of the high-temperature superconducting coated conductor described above. Second coated conductor 10b can be also formed through a common procedure. A commercially available product may be prepared as second coated conductor 10b.

Here, first coated conductor 10a and second coated conductor 10b may have the same configuration, or different configurations. In addition, the thicknesses of first coated conductor 10a and second coated conductor 10b are not limited, and the thicknesses may be the same or different.

Further, the width and/or the length may be the same or different. Note that when first coated conductor 10a and second coated conductor 10b have substantially the same tape width and substantially the same length, first coated conductor 10a or second coated conductor 10b can be laminated with no margin, and the use efficiency of the coated conductor is increased.

Connection Step

In the connection step, they are stacked such that first stabilization layers 14a of first coated conductor 10a and second stabilization layers 14b of second coated conductor 10b face each other, and connected to each other with connection layer 15. The method of connecting first stabilization layers 14a and second stabilization layers 14b is not limited, and they may be connected by a solder or the like, or by applying and curing a metal paste or the like. In addition, they may be connected by the stabilization layer diffusion method without forming connection layer 15.

Groove Formation Step

In the groove formation step, a groove that divides at least second coated conductor 10b, first stabilization layers 14a, and first superconducting layer 13a is formed along the longitudinal direction of first coated conductor 10a and second coated conductor 10b.

Preferably, the groove formation method is a laser irradiation because the above-described second metal substrate 11b can be cut and heat generation can be suppressed, while the groove formation method is not limited. Among them, a nanosecond laser, a picosecond laser, and a femtosecond laser with a pulse length of 100 ns or smaller are preferable. The shorter the pulse length, the finer the shape of the groove can be adjusted.

Among them, preferably, the pulse length is 100 ns or smaller, more preferably 300 fs to 30 ps. When the pulse length is 100 ns or smaller, second metal substrate 11b can be easily cut, and the second coated conductor 10b and/or first coated conductor 10a can be cut in a short time, and therefore, the heat is less applied to them.

In addition, the wavelength of the laser emission is, but not limited to, 157 to 1050 nm, for example. Among them, a laser of which the emission wavelength is in the ultraviolet region, i.e., a UV laser is more preferable. If the wavelength of the laser emission is long, the silver and/or the copper making up the second stabilization layers and/or the first stabilization layers reflect the laser. Consequently, the groove may not be formed at the desired position. On the other hand, in the case where the emission wavelength is within the ultraviolet region, such a reflection less occurs, and the groove can be efficiently formed.

Note that in this specification, the ultraviolet region means a wavelength of 150 nm to 380 nm. As UV laser with such an emission wavelength, it is possible to use harmonics of a YAG solid-state laser or the like whose repetition frequency can be increased, and an excimer laser, which is a gas laser. Its examples include a $F_2$ laser with an emission wavelength of approximately 157 nm, an ArF excimer laser with an emission wavelength of approximately 193 nm, a KrCl excimer laser with an emission wavelength of approximately 222 nm, a KrF excimer laser with an emission wavelength of approximately 248 nm, an XeCl excimer laser with an emission wavelength of approximately 308 nm, an XeF excimer laser with an emission wavelength of approximately 351 nm, the fourth harmonic of a $YVO_4$ laser with an emission wavelength of approximately 266 nm, the third harmonic of a $YVO_4$ laser with an emission wavelength of approximately 355 nm, and the third harmonic of a YAG laser with an emission wavelength of approximately 355 nm.

Note that while the groove is formed to divide second coated conductor 10b (i.e., second metal substrate 11b, second buffer layers 12b, second superconducting layer 13b, and second stabilization layers 14b), first stabilization layers 14a, first superconducting layer 13a, and first buffer layers 12a in the present embodiment, a groove may be formed in a part of first metal substrate 11a.

EXAMPLES

The present invention is described in more detail below with Examples. Note that the scope of the present invention is not limited thereto.

Example 1

Pre-Preparation of First Coated Conductor and Second Coated Conductor

On one surface of a first metal substrate composed of HASTELLOY C276 (registered trademark) in a tape-shape with a width of 10 mm and a thickness of 100 μm, a $Gd_2Zr_2O_7$ (GZO) with a thickness of approximately 56 nm, a $Y_2O_3$ layer with a thickness of approximately 14 nm, a MgO layer with a thickness of approximately 5 nm, and a $LaMnO_3$ layer with a thickness of approximately 7 nm, a $CeO_2$ layer of 600 to 900 nm were formed as the first buffer layers. A first superconducting layer composed of $EuBa_2Cu_3O_7$ with a thickness of 1.6 μm was formed on the first buffer layers. Further, a first stabilization layers was formed using a silver with a thickness of 10 μm on the first superconducting layer, and thus a first coated conductor was obtained.

Note that a defect was artificially provided in first coated conductor for the purpose of verification. More specifically, as illustrated in FIG. 4, defect 31a (groove) with a width of 1 mm and a length of 5 mm from one side of first coated conductor 10a was formed in the direction perpendicular to the longitudinal direction of first coated conductor 10a by removing the first superconducting layer and the first stabilization layers by a chemically etching method. Likewise, defect 31a (groove) with a width of 1 mm and a length of 3 mm from the other side of first coated conductor 10a was formed. Defect 31a was formed to divide it from the first stabilization layers to the first superconducting layer.

On the other hand, a commercially available coated conductor with a width of 4 mm was prepared as the second coated conductor. The second coated conductor 10b was provided with a second metal substrate composed of HASTELLOY C276 with a thickness of 30 μm, a second buffer layers with a thickness smaller than 0.5 μm, a second high-temperature superconducting layer with a thickness of 1 μm, and a second stabilization layers composed of Ag with a thickness of 2 μm.

Connection of First Coated Conductor and Second Coated Conductor

Figure 4A:
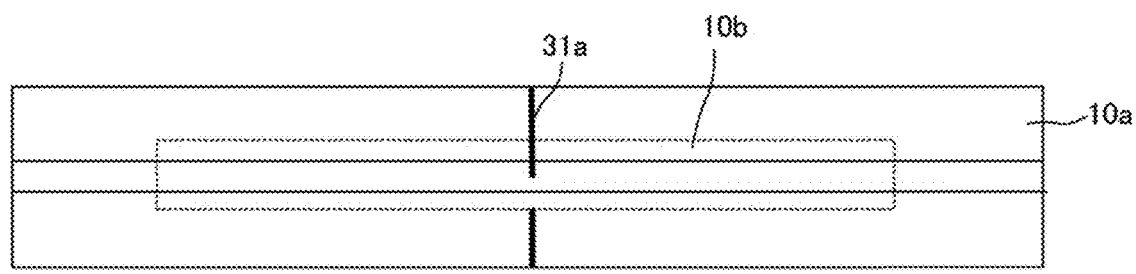
FIG. 4A is a schematic view of a high-temperature superconducting coated conductor produced in Example 1.

A gold nano paste was applied to on the second stabilization layers of second coated conductor 10b. Then, first coated conductor 10a and second coated conductor 10b were stacked such that the first stabilization layers of first coated conductor 10a and the second stabilization layers of second coated conductor 10b face each other, and were thereafter connected through a heat treatment for two hours at 150° C. At this time, as illustrated in FIG. 4A, they were connected such that the center portion of second coated conductor 10b in the width direction and the center portion of first coated conductor 10a in the width direction overlap each other.

Formation of Groove

Figure 4B:
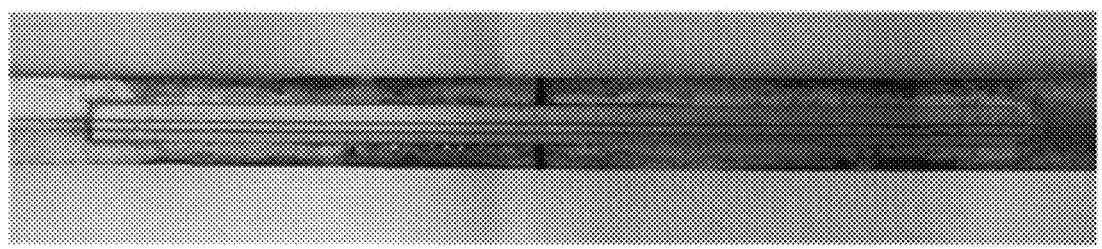
FIG. 4B is a photograph of the high-temperature superconducting coated conductor produced in Example 1 captured from the top side.

Two grooves were formed through scribing treatment with a nanosecond pulsed laser (with an emission wavelength of 355 nm and a pulse length of 30 nanoseconds) along the longitudinal direction of first coated conductor 10a and second coated conductor 10b. The groove was formed to divide a part of the second coated conductor, the first stabilization layers, the first superconducting layer, the first buffer layers, and the first metal substrate. In addition, the width of the groove in planar view of the high-temperature superconducting coated conductor was approximately 30 μm. FIG. 4B is a photograph of the high-temperature superconducting coated conductor produced in Example 1.

Characteristics of High-Temperature Superconducting Coated Conductor

Figure 4C:
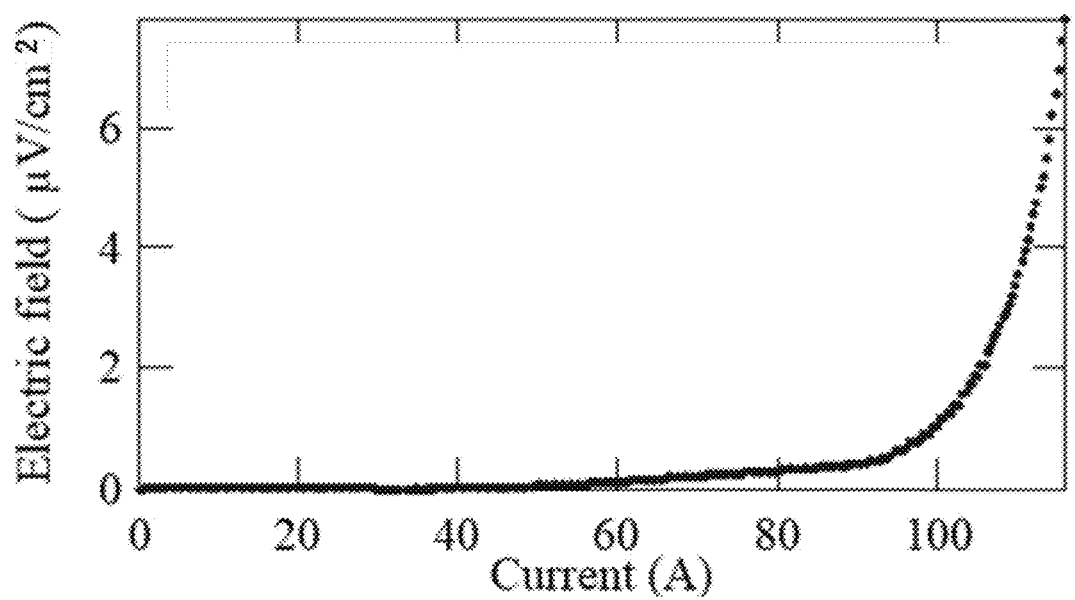
FIG. 4C is a graph illustrating voltage-current characteristics of a filament of the high-temperature superconducting coated conductor of Example 1.

The current-voltage characteristics of a filament (in FIG. 4A, the uppermost filament) in which defect 31a was introduced among the obtained high-temperature superconducting coated conductor was measured. Results are shown in FIG. 4C. In FIG. 4C, the vertical axis indicates the detected electric field ($\mu V/cm^2$), and the horizontal axis indicates the applied current value (A). In this filament, current-voltage characteristics equivalent to those of typical high-temperature superconducting coated conductors were obtained, and its critical current value was 100 A or greater even though the first superconducting layer was completely divided by artificial defect. That is, it can be said that a bypass was caused on the second superconducting layer side at the portion of the defect in the first superconducting layer.

Example 2

Preparation of First Coated Conductor and Second Coated Conductor

Figure 5A:
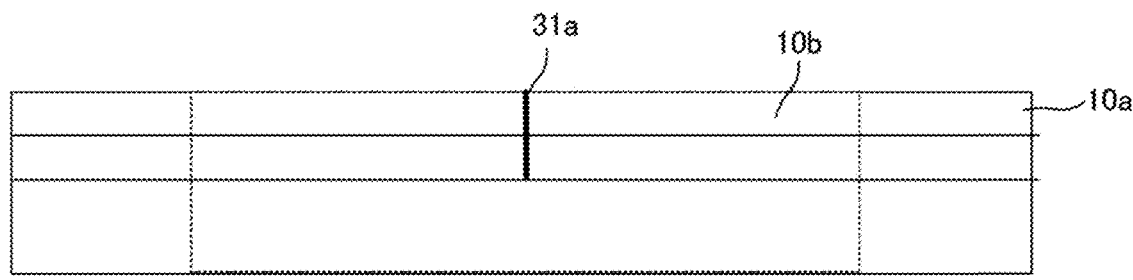
FIG. 5A is a schematic view of a high-temperature superconducting coated conductor produced in Example 2.

First coated conductor 10a with a length of 150 mm of the same configuration as that of the first coated conductor of Example 1, and second coated conductor 10b with a length of 80 mm of the same configuration as that of the first coated conductor of Example 1 were prepared. Defect 31a (groove) was artificially provided in first coated conductor 10a for the purpose of verification. More specifically, as illustrated in FIG. 5A, defect 31a (groove) with a width of 1 mm and a length of 5 mm from one side of first coated conductor 10a was formed in the direction perpendicular to the longitudinal direction of first coated conductor 10a by a chemically etching method as described above. Defect 31a (groove) was formed to divide it from the first stabilization layers to the first superconducting layer.

Connection of First Coated Conductor and Second Coated Conductor

After first coated conductor 10a was subjected to solder bath (PbSn), first coated conductor 10a and second coated conductor 10b were stacked and connected such that the first stabilization layers of first coated conductor 10a and the second stabilization layers of second coated conductor 10b face each other.

Groove Formation

Two grooves were formed through scribing treatment with a picosecond pulsed laser (with a wavelength of 355 nm and a pulse length of 10 picoseconds) along the longitudinal direction of first coated conductor 10a and second coated conductor 10b. The grooves were formed at positions 2.5 mm and 5 mm from one side of high-temperature superconducting coated conductor. In addition, with each groove, a part of the second coated conductor, the first stabilization layers, the first superconducting layer, the first buffer layers, and the first metal substrate was divided. In addition, the width of each groove in planar view of the high-temperature superconducting coated conductor was 40 µm.

Characteristics of High-Temperature Superconducting Coated Conductor

Figure 5B:
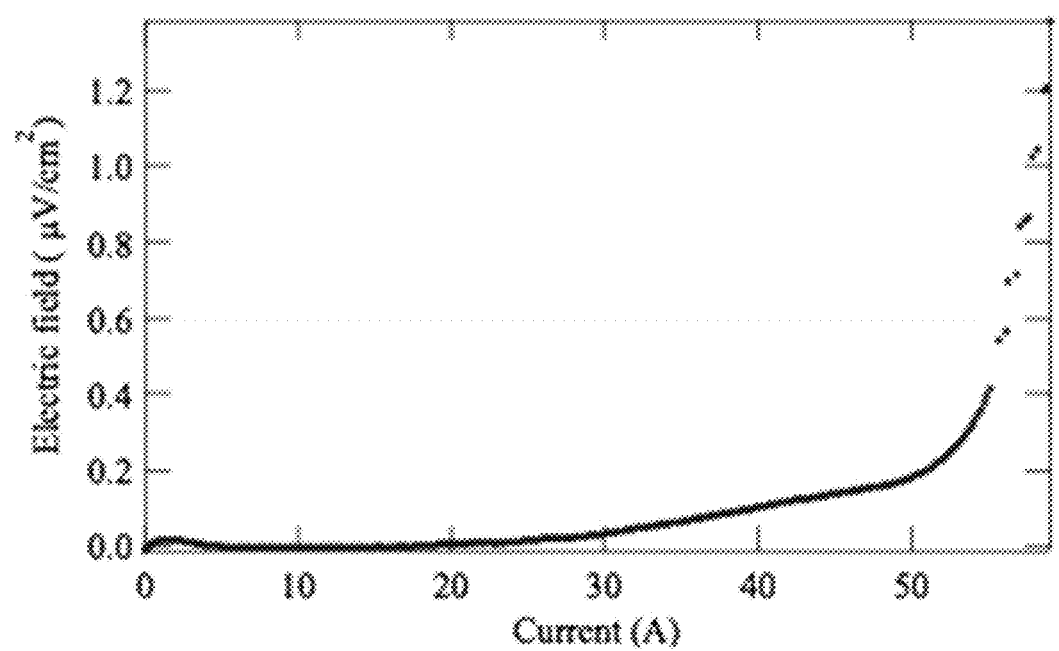
FIG. 5B is a graph illustrating voltage-current characteristics of a filament in a high-temperature superconducting coated conductor of Example 2.

The current-voltage characteristics of a filament (in FIG. 5A uppermost filament) in which a defect was introduced among the obtained high-temperature superconducting coated conductors were measured. Results are shown in FIG. 5B. In FIG. 5B, the vertical axis indicates the detected electric field ($\mu V/cm^2$), and the horizontal axis indicates the applied current value (A). In the filament, current-voltage characteristics equivalent to those of typical high-temperature superconducting coated conductors were obtained even though the first superconducting layer was divided. In addition, its critical current value was 50 A or greater. That is, it can be said that a bypass was caused on the second superconducting layer side at the portion of the defect in first superconducting layer.

Example 3

Figure 6A:
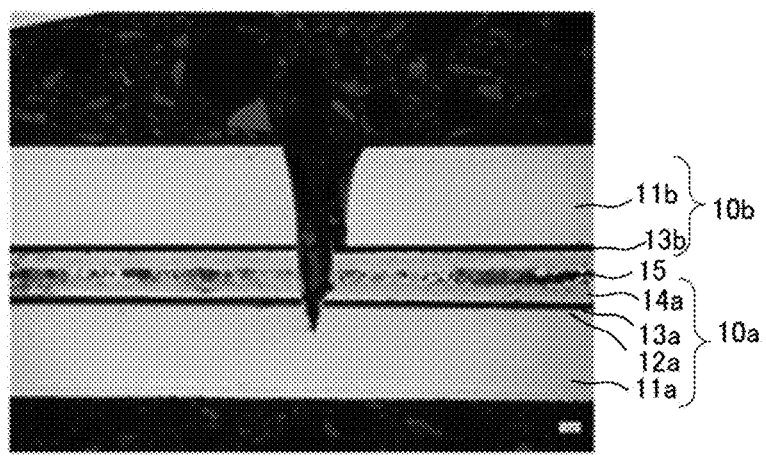
FIGS. 6A to 6C are photographs of a cross section of a high-temperature superconducting coated conductor produced in Example 3 observed with a scanning electron microscope.

A high-temperature superconducting coated conductor was produced as in Example 2 except that no defect was artificially provided in the first coated conductor. The cross-section of the high-temperature superconducting coated conductor was observed with a SEM (scanning electron microscope). Results are shown in FIG. 6A. As shown in FIG. 6A, a part of not only second coated conductor 10b, but also first stabilization layers 14a, first superconducting layer 13a, first buffer layers 12a, and first metal substrate 11a of first coated conductor 10a were successfully divided by scribing treatment with a picosecond pulsed laser (emission wavelength 355 nm).

Figure 6B:
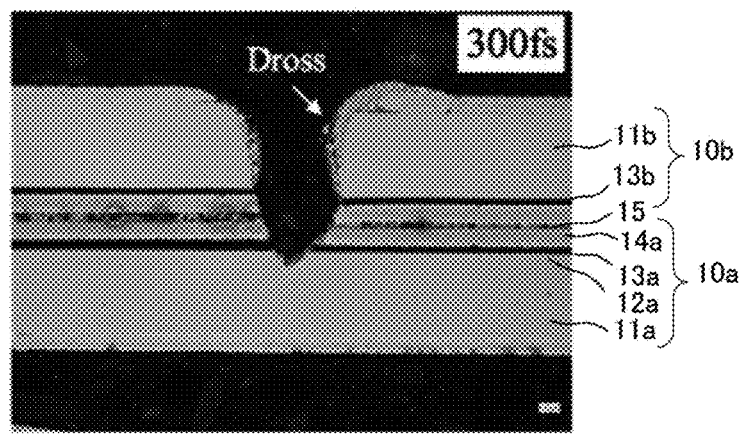
Figure 6C:
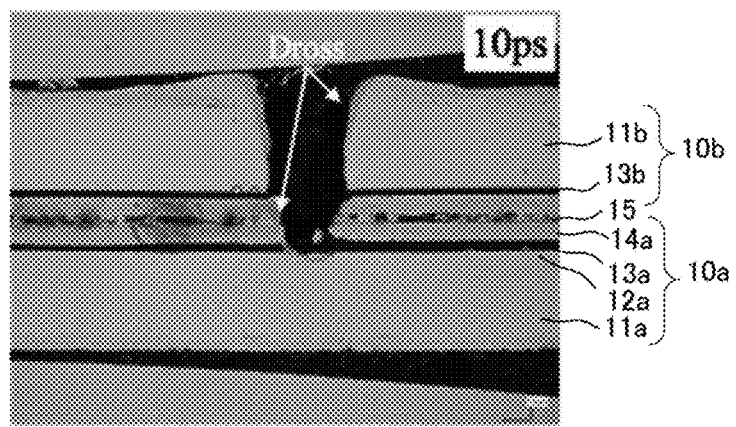

Next, FIG. 6B shows a cross-section of a case where a groove was formed with a femtosecond pulsed laser (with an emission wavelength of 1 µm and a pulse length of 300 femtoseconds) instead of the above-mentioned picosecond pulsed laser. In addition, FIG. 6C shows a cross-section of a case where a groove was formed with a picosecond pulsed laser (with an emission wavelength of 1 µm and a pulse length of 10 picoseconds). In both cases, a part of not only second coated conductor 10b, but also first stabilization layers 14a, first superconducting layer 13a, first buffer layers 12a, and first metal substrate 11a of first coated conductor 10a were successfully divided.

Reference Examples

Figure 7:
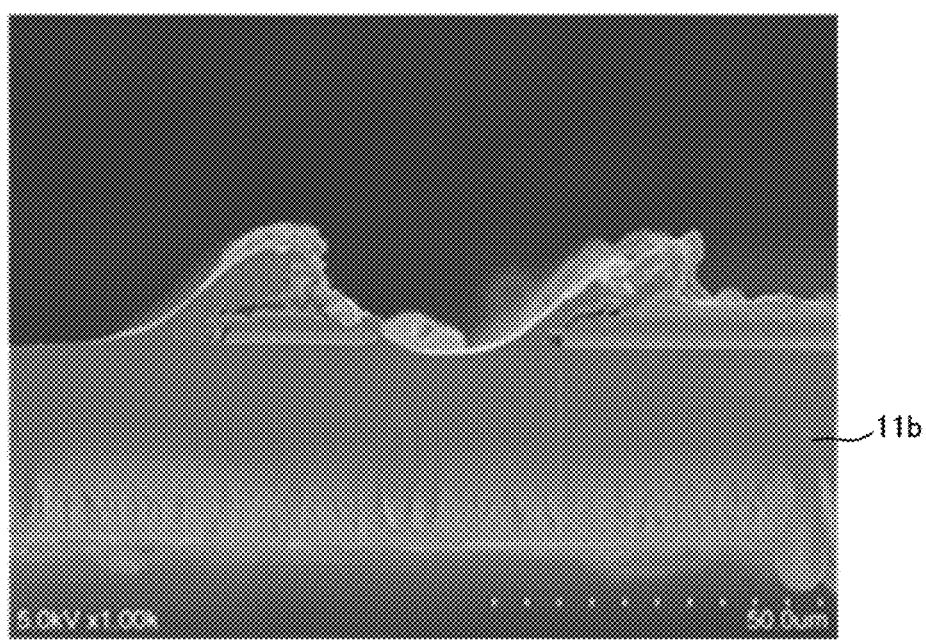
FIG. 7 is a photograph of a cross section of a high-temperature superconducting coated conductor produced in a reference example observed with a scanning electron microscope.

The first coated conductor and the second coated conductor were stacked as in Example 2. A KrF excimer gas laser at 100 Hz and a maximum output of 0.5 J (with a wavelength 248 nm and a pulse length of 15 nanoseconds) was applied to the coated conductor in an attempt to form a groove. However, a commonly used KrF excimer gas laser failed to penetrate through second metal substrate 11b as shown in FIG. 7.

This application is entitled to and claims the benefit of Japanese Patent Application No. 2021-009425 filed on Jan. 25, 2021, the disclosure each of which including the specification, drawings and abstract is incorporated herein by reference in its entirety.

INDUSTRIAL APPLICABILITY

The high-temperature superconducting coated conductor of the present invention achieves a high critical current and low AC loss. Accordingly, the high-temperature superconducting coated conductor is applicable to superconducting magnets, superconducting cables, power apparatuses and devices, and the like.

REFERENCE SIGNS LIST

10 Coated conductor
10a First coated conductor
10b Second coated conductor
11 Metal substrate
11a First metal substrate
11b Second metal substrate
12 buffer layers
12a First buffer layers
12b Second buffer layers
13 Superconducting layer
13a First superconducting layer
13b Second superconducting layer
14 Stabilization layers
14a First stabilization layers
14b Second stabilization layers
15 Connection layer
20 Filament
31a, 31b Defect
100 High-temperature Superconducting Coated conductor

What is claimed is:

1. A high-temperature superconducting coated conductor:
a first metal substrate with a long shape; and
multiple filaments disposed on the first metal substrate and extended along a longitudinal direction of the first metal substrate,
wherein a gap is provided between each of the multiple filaments, and
each of the multiple filaments includes a first superconducting layer containing a rare-earth element, a first stabilization layers, a second stabilization layers, a second superconducting layer containing a rare-earth element, and a second metal substrate in this order from the first metal substrate side.

2. The high-temperature superconducting coated conductor according to claim 1, wherein each of the multiple filaments further includes a first buffer layers disposed between the first metal substrate and the first superconducting layer, and a second buffer layers disposed between the second superconducting layer and the second metal substrate.

3. The high-temperature superconducting coated conductor according to claim 1, wherein each of the multiple filaments further includes a connection layer containing a metal between the first stabilization layers and the second stabilization layers.

4. The high-temperature superconducting coated conductor according to claim 1, wherein each of the first superconducting layer and the second superconducting layer contains a $REBa_2Cu_3O_x$ compound, where RE represents at least one an element selected from a group consisting of Gd, Eu, Y, Sm, Nd, Dy, Er, Yb, Ho, La, Tb, Tm, and Lu, and x represents 6.2 to 7.0.

5. The high-temperature superconducting coated conductor according to claim 1, wherein filaments adjacent to each other among the multiple filaments are completely separated from each other.

6. The high-temperature superconducting coated conductor according to claim 1, wherein in planar view of the high-temperature superconducting coated conductor, a summed area of top surfaces of the multiple filaments is 80% or greater of a summed area of a region where the multiple filaments is formed and a region where the gap is formed.

7. The high-temperature superconducting coated conductor according to claim 1, wherein an insulator is disposed between the filaments adjacent to each other.

8. A manufacturing method for a high-temperature superconducting coated conductor, the method comprising:
preparing a first coated conductor with a long shape and a second coated conductor with a long shape, the first coated conductor including a first metal substrate, a first superconducting layer deposited on the first metal substrate and containing a rare-earth element, and a first stabilization layers deposited on the first superconducting layer, the second coated conductor including a second metal substrate, a second superconducting layer deposited on the second metal substrate and containing a rare-earth element, and a second stabilization layers deposited on the second superconducting layer;
connecting the first coated conductor and the second coated conductor such that the first stabilization layers and the second stabilization layers face each other; and
forming a groove dividing the second coated conductor, the first stabilization layers, and the first superconducting layer along a longitudinal direction of the first coated conductor and the second coated conductor.

9. The manufacturing method for the high-temperature superconducting coated conductor according to claim 8, wherein the forming the groove includes applying a laser.

10. The manufacturing method for the high-temperature superconducting coated conductor according to claim 9, wherein the laser is any of a nanosecond laser, a picosecond laser, or a femtosecond laser.

11. The manufacturing method for the high-temperature superconducting coated conductor according to claim 9, wherein an emission wavelength of the laser is in an ultraviolet region.

12. The manufacturing method for the high-temperature superconducting coated conductor according to claim 8, wherein the connecting the first coated conductor and the second coated conductor includes connecting the first coated conductor and the second coated conductor with a solder or a metal paste.

* * * * *